(12) United States Patent
Garland et al.

(10) Patent No.: US 8,583,568 B2
(45) Date of Patent: Nov. 12, 2013

(54) SYSTEMS AND METHODS FOR DETECTION OF SATISFICING IN SURVEYS

(75) Inventors: Philip Garland, San Francisco, CA (US); Kuang Chen, Berkeley, CA (US)

(73) Assignee: SurveyMonkey.com, LLC, Palo Alto, CA (US)

( * ) Notice: Subject to any disclaimer, the term of this patent is extended or adjusted under 35 U.S.C. 154(b) by 242 days.

(21) Appl. No.: 13/218,889

(22) Filed: Aug. 26, 2011

(65) Prior Publication Data

US 2013/0054497 A1    Feb. 28, 2013

(51) Int. Cl.
G06F 15/18    (2006.01)
G06F 17/00    (2006.01)
G06Q 10/00    (2012.01)
G06N 99/00    (2010.01)
G06Q 30/02    (2012.01)

(52) U.S. Cl.
CPC .......... *G06N 99/005* (2013.01); *G06Q 30/0201* (2013.01)
USPC ............................... 706/12; 706/45; 705/7.29

(58) Field of Classification Search
None
See application file for complete search history.

(56) References Cited

U.S. PATENT DOCUMENTS

| 7,418,496 | B2 | 8/2008 | Macey et al. |
| 7,542,913 | B1 | 6/2009 | Meek et al. |
| 2012/0089546 | A1* | 4/2012 | Ahmed ............................ 706/45 |

FOREIGN PATENT DOCUMENTS

| EP | 1035486 | 3/2000 |
| JP | 2005-202619 | 7/2005 |
| KR | 10-1999-006829 | 9/1999 |

OTHER PUBLICATIONS

Intenational Search Report (PCT/US2012/052546) dated Feb. 15, 2013; dated 3 pages.

* cited by examiner

*Primary Examiner* — Alan Chen

(74) *Attorney, Agent, or Firm* — Marger Johnson & McCollom PC

(57) ABSTRACT

Response data relating to a plurality of responses to a survey is received. The survey comprises a plurality of questions. The response data for each of the plurality of responses comprises a plurality of answers to at least a subset of the plurality of questions. A questionnaire response model is created using the response data. It is then determined, for each questionnaire response, a respective probability that the respective questionnaire response represents satisficing, such that where the respective probability exceeds a threshold, the respective questionnaire response is identified as an outlier, and where the respective probability does not exceed the threshold, the respective questionnaire response is identified as an inlier. A representation of each questionnaire response is output, each respective representation reflecting the likelihood that the respective response to which the respective representation represents satisficing.

24 Claims, 7 Drawing Sheets

SYSTEMS AND METHODS FOR DETECTION OF SATISFICING IN SURVEYS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates to systems and methods for defining and conducting automated surveys, and more particularly for systems and methods for self-service systems for conducting multimodal surveys.

BACKGROUND

Surveys have long been a staple method for business to gather information for strategic and tactical decisions. Surveys enable businesses to determine consumer preferences for products and services, as well as consumer's experience and satisfaction with a company's customer service. The evolution of telephone communications and the Internet have enabled businesses to define and conduct automated surveys quickly and efficiently via such mediums without the need for human intervention.

The effectiveness of surveys can be greatly diminished by what is referred to as "satisficing". Satisficing refers to a phenomenon where survey participants answer questions in a half-hearted or arbitrary manner. When a user answers a question in an optimal way, they 1) interpret the question, 2) search memory for relevant information, 3) integrate information into summary judgment, and 4) report judgment. Anytime a person engages in steps two or three half heartedly, they are said to be weak satisficers and skipping any entirety is a feature of strong satisficing.

BRIEF DESCRIPTION OF THE DRAWINGS

The foregoing and other objects, features, and advantages of the present disclosure will be apparent from the following more particular description of various embodiments as illustrated in the accompanying drawings and claims.

DETAILED DESCRIPTION

Figure 1:
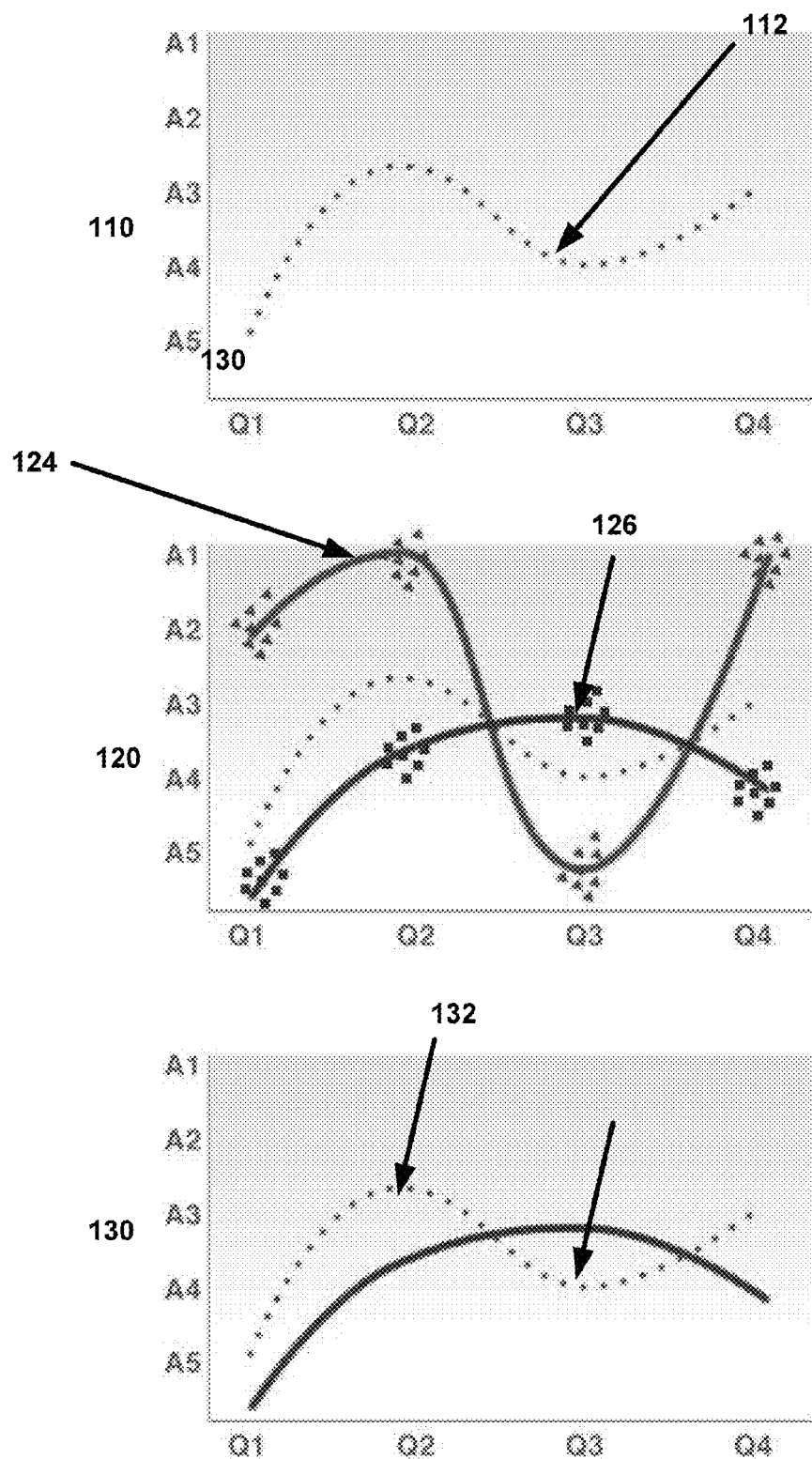
FIG. 1 illustrates how satisficing data can strongly skew the pattern of survey responses.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer-readable medium stores computer data, which data can include computer program code that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium. Modules may be integral to one or more servers, or be loaded and executed by one or more servers. One or more modules may grouped into an engine or an application.

As used herein, a survey should be understood to generally refer to a method used to collect information from a sample of individuals in a systematic way. A survey may focus on different topics such as preferences, behavior (smoking and drinking behavior), or factual information, depending on its purpose. One method of conducting a survey is through use a questionnaire. As used herein, a questionnaire should be understood to comprise a plurality of questions relating to one or more survey topics. As used herein, a survey response should be understood to refer generally to data collected from one or more individuals in response to a survey. As used herein, a questionnaire response should be understood to comprise answers received from an individual to one or more questions on a questionnaire.

Typically, when researchers view survey results, the results include both optimized survey responses and survey responses where survey response are satisficed to a greater or lesser degree. FIG. 1 illustrates how this data can strongly skew the pattern of survey responses. The line 124 is the satisficing group and the line 126 is the true/optimized group. The dotted line 132 shows the average of the two groups. If the data from the satisficing group 125 can be removed from the set of all survey responses, only optimized survey responses 136 remain.

One easy way to understand this is if a person checks the 'male' box for gender, but the 'yes' box for "have you been pregnant in the past three years" then that would be an outlier. Multiple mismatches in responses across a questionnaire with, say, five questions or more would suggest (though not guarantee) satisficing. The more outlandish the combinations of answers, then the more likely the person is satisficing.

The present disclosure is directed to systems and methods that automatically detect satisficing in survey responses. In various embodiments, the systems and methods described herein, for an arbitrary questionnaire, learns a custom probabilistic model from the questionnaire data, which stochastically relates the questions. The model serves as a foundation for satisficer detection. For each response, the systems and methods described herein calculate a satisficing score that measures the degree to which a value response value is a multivariate outlier. For a response instance, the set of scores to can be combined to create a meta score. In one embodiment, if the meta score is over a user specified threshold, then the response is considered a satisficer.

Figure 2:
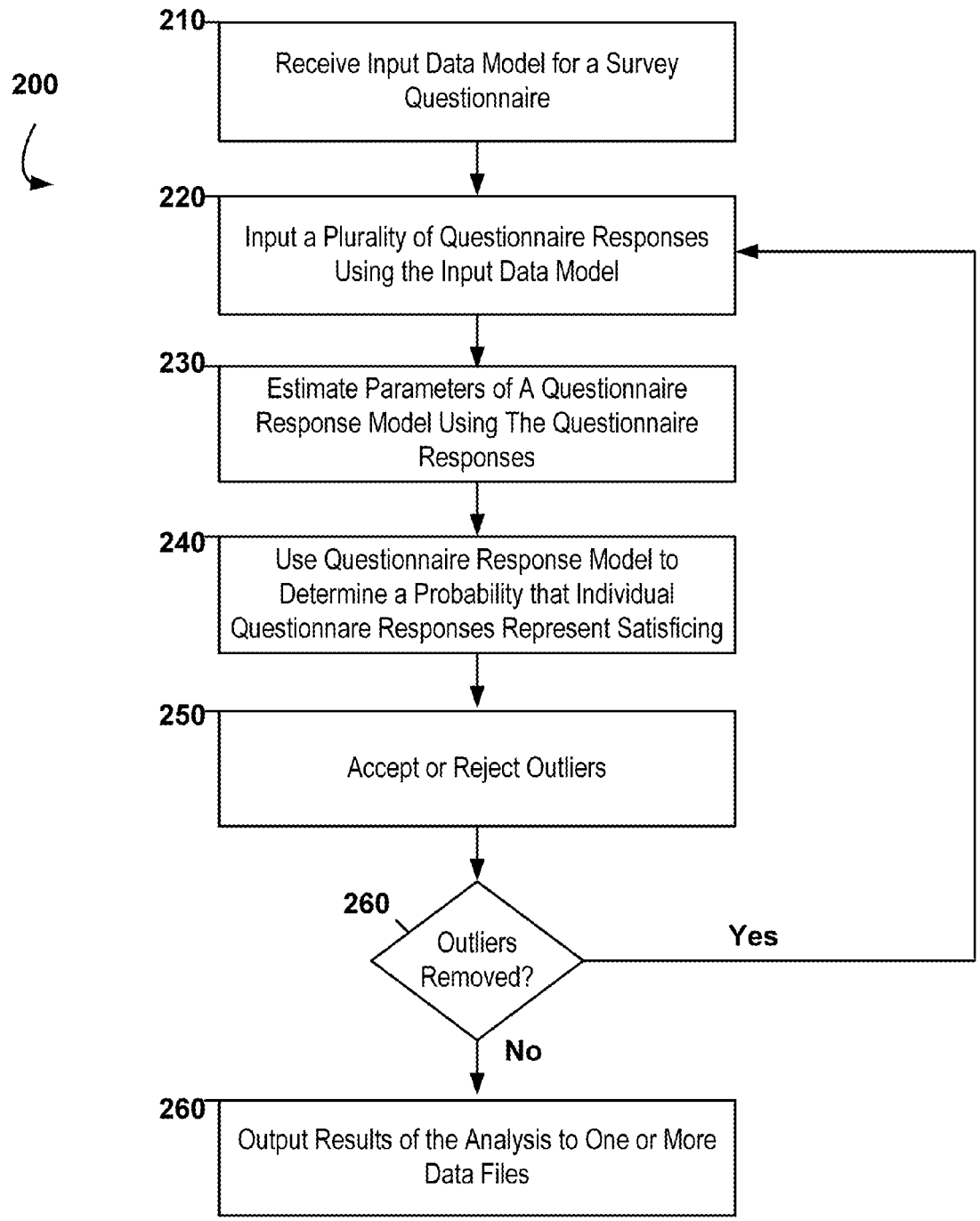
FIG. 2 illustrates a high-level overview of one embodiment of a process for automated detection of satisficing in survey responses.

FIG. 2 illustrates a high-level overview of a process for automated detection of satisficing in survey responses. Unless otherwise specified, it should be understood that the processing described with respect to each of the blocks of FIG. 2 is performed by at least one computing device. In an embodiment (or multiple embodiments alone or in combination), such a computing device could be one or more of the satisficing detection servers 582 of FIG. 5.

In block 210 of the process, an input data model representing the structure of a questionnaire is input into the system. In one embodiment, the input data model can comprise the following data for each question in a questionnaire:
 QName—a unique name for the question;
 Type—a choice between String, Integer or Float;
 MaxIndex—a maximum discrete index for expected values in question responses, assuming 0 is null (described in greater detail below).

In one embodiment, the system can detect errors in the input data model, for example:
 If QNames not unique;
 If Type invalid or missing;
 If MaxIndex<0.

In one embodiment, the input data model can comprise entries for every question in the questionnaire. In one embodiment, the input data model can comprise entries for only selected questions in the questionnaire. For example, questions that will not contribute to detecting satisficers can be omitted. This can enhance the performance of the system. Such fields could include sparsely populated fields, such as when skip logic is employed in conducting the survey or highly skewed value distributions, e.g. mostly blanks or "Gender" in survey of all women.

Referring back to FIG. 2, in block 220 of the process, using the input data model, a plurality of questionnaire responses are input into the system.

In one embodiment, the questionnaire responses are received in electronic form, and answers within the questionnaire have column names and discrete values matching the input data model. In one embodiment, the questionnaire responses are received in electronic form, and answers within the response are transformed to match the input data model.

In one embodiment, values questionnaire responses are descretized using the input data model, which is to say, values $v1$ to $vN$ are mapped to integer values $0 \ldots n+1$, for example:
 Null $\rightarrow$ 0
 v0 $\rightarrow$ 1
 v1 $\rightarrow$ 2
 vN $\rightarrow$ n+1

In one embodiment, encoded values of answers having a limited range of unique values, such as categorical, ordinal, and enumerated question answers, can be directly mapped to integers starting from 0, for example in the case of an enumerated question answer having potential answers of A, B, C and D, the descretized values could be:
 Null $\rightarrow$ 0
 A $\rightarrow$ 1
 B $\rightarrow$ 2
 C $\rightarrow$ 3
 D $\rightarrow$ 4

In one embodiment, the maximum discrete index specifies the maximum integer that can be assigned to a value for a given data field. For example, in the above example, where a question has only four possible non-null answers, the maximum discrete index would be set to 4.

In one embodiment, the data model does not specify actual expected values (e.g. A, B, C etc.) for a question nor integer values assigned to a given value. Rather, as the data is processed, as new unique values for a given field are recognized, they are assigned integer values in sequence (e.g. 1 to the first value recognized, 2 to the next unique value recognized and so forth) Alternatively, an entire input data file could be processed in two passes where in the first pass all unique values for a given field identified, and then such unique values are be sorted and assigned to integers in sequence (e.g. A=1, B=2, C=3 regardless of where such values first appear in the file), and in the second pass, the data is descretized accordingly.

In one embodiment, the data model could explicitly include additional elements expressly defining expected input values for one or more data fields (e.g. A=1, B=2, C=3 regardless of where such values first appear in the file).

In one embodiment, where input data fields represent a potentially large number of unique values such as, for example, fields with continuous values or fields with freeform text responses, data in such fields could be assigned to a limited number of unique integer values using various techniques. For example, where MaxIndex=5, and data values are in a continuous range of 0-100, data could be classified into 1 of 5 ranges (e.g. 1-20, 21-40, 41-60, 61-80 and 81-100, corresponding to index values of 1, 2, 3, 4 and 5 respectively). In another example, where an input data field is free form text, the text could be analyzed for the presence or absence of a given word or phrase, corresponding to integer values of 1 and 2 (0 being null, or no answer.)

In one embodiment, processing required to transform such data fields could be specified in the data model, and such processing automatically occurs as part of data input. In one embodiment, the input data file could be preprocessed to normalize data fields to a limited number of unique values.

In one embodiment, the input data must include a unique ID (UID), which are ignored in satisficing detection but used to index the input responses. In one embodiment, the input data model is used to verify questionnaire responses when questionnaire responses are input to the system, for example, during input verification, the system can raise errors on the following conditions:

If data does not contain UID, or UID is not unique;
If columns in data do not match QNames specified;
If the domain of an input data field does not match Type;
If the descretized data value is not in [0 ... MaxIndex] (e.g. where MaxIndex=4, and A, B, C and D have been recognized, E will raise an error).

In one embodiment, the survey responses are received as a batched data file. Such files could be provided in any format now known, or later to be developed, such as, for example, CSV, Excel or XML. In one embodiment, the survey responses are received as a real-time data stream from, for example, an online survey system. In one embodiment, the a plurality of questionnaire responses represent a training set used to generate the questionnaire response model as described below. In one embodiment, the plurality of questionnaire responses represents a set of actual survey results, which are to be analyzed as described below.

In one embodiment, upon completion of input of the data file, the system could provide the user an estimate of time required to process the file and offer the user the option to continue or abort processing of the data. In one embodiment, where the estimate of time exceeds a predetermined threshold, the system could terminate the processing of the file, require the user to accept higher processing fees for processing the file or defer processing the file to off-peak load hours (e.g. 3:00 AM).

Referring back to FIG. 2, in block 230 of the process, a questionnaire response model is then created using the input questionnaire responses.

In one embodiment, the system attempts to find the conditional independencies between the questions of the input data set. A less preferred but nonetheless valid approach to structure selection would be to assume complete dependence of each question on every other question. However, this would inflate the number of free parameters in the model, leading to both poor generalization performance of predictions and prohibitively slow model queries. In one embodiment, a standard machine learning technique called structure-learning can be employed. Structure-learning searches through the space of possible structures, selecting the most prominent probabilistic dependencies.

In one embodiment, the system searches through the space of possible structures using simulated annealing, and chooses the best structure according to the Bayesian Dirichlet Equivalence criterion. This criterion optimizes for a tradeoff between model expressiveness (using a richer dependency structure) and model parsimony (using a smaller number of parameters), thus identifying only the prominent, recurring probabilistic dependencies.

In one embodiment, the structure-learning algorithm is can be parameter driven. For example, the algorithm can take as input:

A list variable names each representing a column of data (e.g. QNames presented in the input data, minus the UID);
A discretization policy, interval or quantile;

To keep structure-learning within reasonable computational bounds heuristics can be provided, for example:

A maximum discretization threshold.
A maximum number of conditional dependencies.
A maximum amount of time spent for the algorithm.

Figure 3:
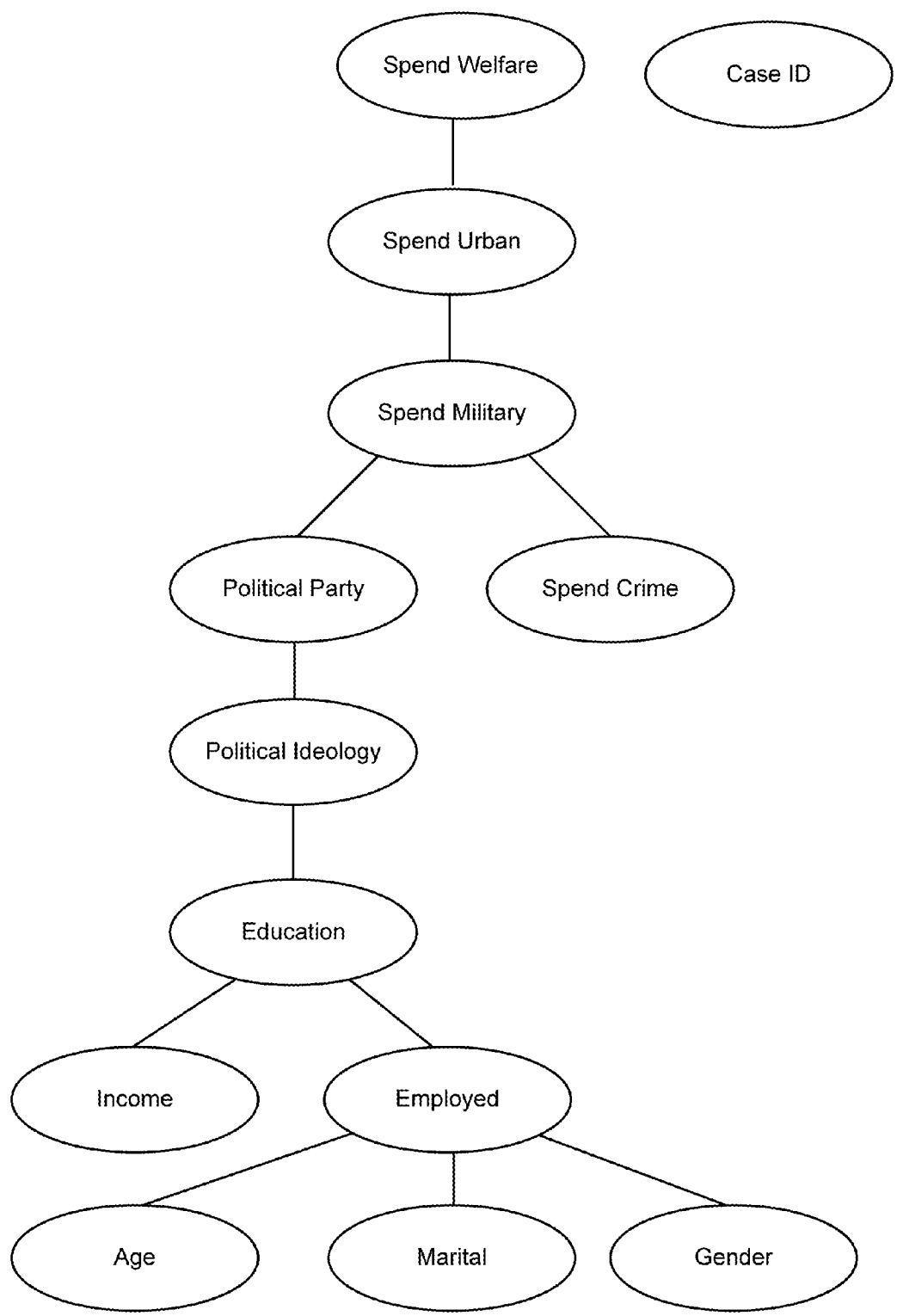
FIG. 3, illustrates one embodiment of an automatically learned structure for a survey data file of political opinions and demographics.

The output of structure-learning is a graph; for example see FIG. 3, showing an automatically learned structure for a survey data file of political opinions and demographics. FIG. 3 shows how political survey responses tend to be highly correlated. Some relationships are intuitive (Political Ideology—Political Party), others show patterns incidental to the data file (Race-Gender). It is important to note that the lines in the network do not represent causality, only that there is a probabilistic relationship between the questions. Note that a standard joint distribution would show correlations among all pairs of questions; the sparsity of these examples reflects conditional independence patterns learned from the data.

In one embodiment, questionnaire designers may already have strong intuition about questions that should or should not depend on each other. As an intermediate step, the output of structure-learning could be presented to the user for manual tuning. In one embodiment, the entire structure could be manually constructed when an expert has comprehensive prior knowledge of questions' interdependencies. For casual users, it is unlikely that they will have considered the complete space of question combinations when identifying correlations. Thus, in many cases, structure-learning would be crucial in enabling satisficing detection.

Referring back to FIG. 2, in block 230 of the process, the system then estimates the parameters of the questionnaire response model.

In one embodiment, given the structure of the questions' relationships, the system can estimate conditional probability tables to parameterize each node. In one embodiment, conditional probability tables are used in preference to continuous distributions to model each noted for simplicity. In one embodiment, the system uses continuous distributions to model each node.

In one embodiment, estimating conditional probability tables involves counting the proportion of existing answers when related questions are known to have related other answers. The probability mass function for a single question $F_i$ with m possible discrete values, conditioned on its set of parent nodes $\rho(F_i)$ from the Bayesian network, is:

$$P(F_i = f_i \mid \{F_j = f_j : F_j \in \rho(F_i)\}) = \frac{N(F_i = f_i, \{F_j = f_j : F_j \in \rho(F_j)\})}{N(\{F_j = f_j : F_j \in \rho(F_i)\})}$$

In this notation, $P(F_i = f_i \mid \{F_j = f_j : F_j \epsilon \rho(F_i)\})$ refers to the conditional probability of question Fi taking value $f_i$, given that each question j in $\rho(F_i)$ takes on value $f_j$. Here, N(X) is the number of questionnaire responses that match the conditions X in the denominator, we count the number of times a previous submission had the subset $\rho(F_i)$ of its questions set according to the listed $f_j$ values; and in the numerator, we count the number of times when those previous submissions additionally had $F_i$ set to $f_i$.

Where the number of responses are limited, and may not cover all cases of values (e.g. extreme liberal and for death penalty), 0 parameter estimates can be smoothed by interpolating each estimate with a uniform background distribution value. In one embodiment, the output of this step is a Bayesian network with conditional probability tables represented as a (.bif file).

Figure 4:
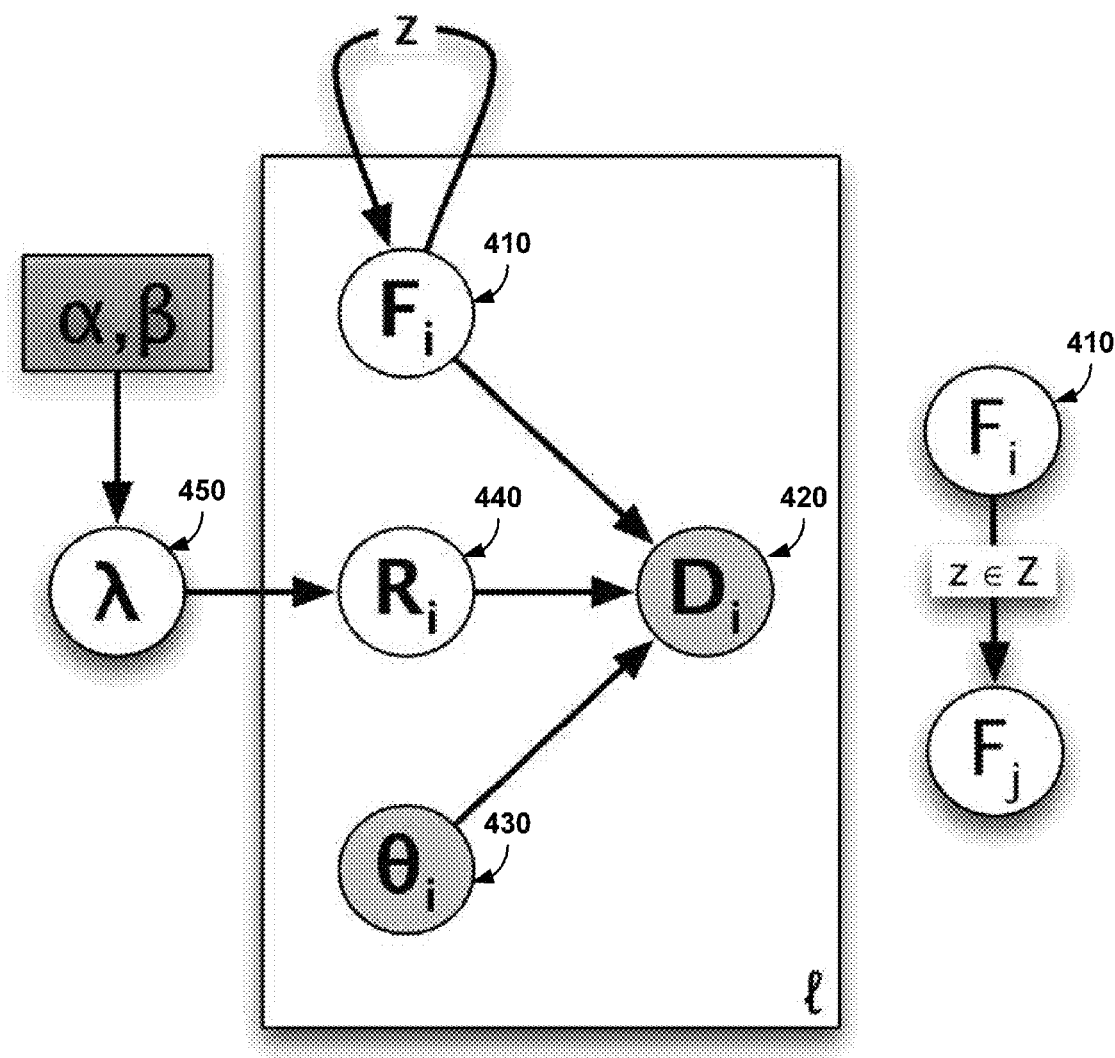
FIG. 4 illustrates a graphical view of one embodiment of a method for extending a Bayesian network.

Such a Bayesian network could be extended to a more sophisticated representation that ties together satisficing and non-satisficing question responses. Specifically, each question variable is augmented with additional nodes to capture a probabilistic view of satisficing. FIG. 4 illustrates a graphical view of one embodiment of a method for extending a Bayesian network. For question i, the following set of random and observed variables are used:

$F_i$ 410 is the non-satisficing answer to the question, which is unknown to the system and a hidden variable.

$D_i$ 420 is the answer provided by the respondent, an observable variable.

$\theta_i$ 430 is an observed variable representing the likelihood of satisficing answers across all possible answers. The number can be fixed, or in the case of some survey designs having satisficing answers being more likely to be the top choices—skewed toward top choices (but still static).

$R_i$ 440 is a binary hidden variable specifying whether a value is satisficing value or a true value. When $R_i$ 440 is 0, then $D_i$ 420 takes the same value as $F_i$ 410, but when $R_i$ 440 is 1, $D_i$ 420 selects a value from $\theta_i$ 430.

$\lambda$ 450 is a hidden prior value, which is shared across all questions, which specifies the background likelihood that a question will take on a satisficing answer. In one embodiment, $\lambda$ 450 could be exposed to the user, if the user had a good idea of what percentage of respondents will exhibit satisficing behavior.

This model implies that a respondent implicitly flips a coin for R when responding to a question i, with the probability of 1 equal to $\lambda$. The answer D is modeled as being drawn from either the true answer F or the satisficing answer $\theta$, depending on whether R is 1 or 0. Note that the relationships between question values discovered during structure-learning are still part of the graph, so that each F is contextualized by the answers of other related questions (through z).

The output of model building is the data structure representing the augmented Bayesian network, ready for inference.

Referring back to FIG. 2, in block 240 of the process, the questionnaire response model is used to determine a probability that individual questionnaire responses represent satisficing.

In one embodiment, the system infers the values of $Pr(R_i|D_i \ldots D_n)$, the probability that an answer is satisficing given the other answers. In one embodiment, Bayesian inference procedures are used. When all answers in a given questionnaire response have been thus evaluated, a total weighted satisficing rate can then be calculated for the response. In one embodiment, questions are uniformly weighted. In one embodiment, the weights of fields in a survey response are decreased where the field is one of several fields with many missing values that are found to be strongly correlated to each other.

Figure 5:
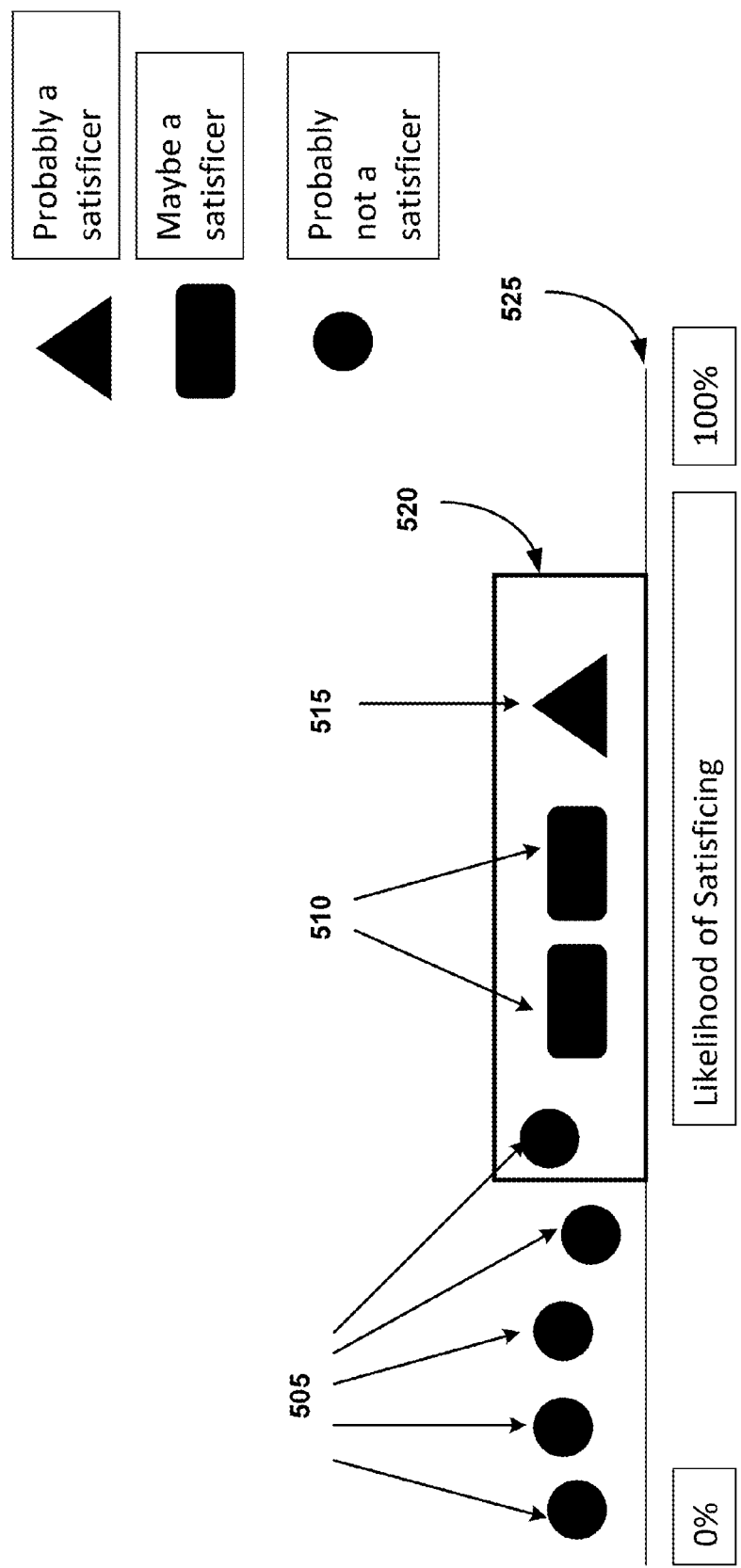
FIG. 5 illustrates a high-level view of one embodiment of a system 500 capable of supporting various embodiments of the systems and methods described herein.

In one embodiment, questionnaire responses whose total weighted satisficing rate exceeds a predetermined threshold value are considered outliers. In one embodiment, questionnaire responses whose total weighted satisficing rate is not less than a predetermined threshold value are considered outliers. In one embodiment, the threshold relates to a level of probability reflecting a confidence that where the respective probability is not less than the threshold, the respective questionnaire response represents satisficing In one embodiment, the threshold value represents a system default. In one embodiment, the threshold value can be configured and modified on demand by users. FIG. 5 illustrates this concept graphically. In the illustration, there are eight survey responses 505, 510 and 515. The x-axis of the graph represents a percentage representing the likelihood survey responses represent satisficing (e.g. total weighted satisficing rate). The box 520 corresponds to a user configurable threshold. Five of the responses 505 probably do not reflect satisficing, two 510 may be satisficers and one 515 is probably a satisficer. A user has set a threshold 525 such that four of the responses are considered by the user as outliers. As shown in the illustration, in one embodiment, the threshold comprises a range having a lower bound and an upper bound, where the upper bound may or may be equal to 100%.

In one embodiment, when all outliers in the input file have been identified, the system could display various types of summary statistics relating to satisficing. For example, the system could display the number of inliers and the number of outliers as numbers and/or in a graphical format. Such numeric or graphical formats could include, for example, a table or stacked bar graph of means of the two groups with variance for each group on each question. In one embodiment, the system could report the percentage of outliers over time (e.g., length of survey—"after question #XX satisficing increases dramatically"). Such results could be expressed numerically, textually and/or graphically, for example, as a line graph form with prose about how to interpret results.

In one embodiment, summary statistics as described above could be presented to the user via a user interface, a report in electronic or hardcopy format, or in an email sent to the user when detection of outliers is complete.

In block 250 of the process, outliers in the questionnaire responses are then accepted or rejected. In one embodiment, all outliers could be automatically rejected without user interaction. In one embodiment, outliers could be displayed to a user via a user interface, and the user could accept or reject individual outliers via the user interface (e.g. selecting a check box, etc.)

In one embodiment, if any outliers are rejected 260, the process loops back to block 220 of the process, and a new questionnaire response model is then created using inliers and any accepted outliers and process blocks 220-250 are repeated, potentially identifying a different set of outliers using the new model. In one embodiment, steps 220-250 are repeated until no outliers are rejected. In one embodiment, steps 220-250 repeated until a stable core of inliers is reached. In one embodiment, steps 220-250 are repeated a fixed number of repetitions (e.g. 3). In one embodiment, steps 220-250 are repeated until a user explicitly accepts the results of the processing of steps 220-250.

In one embodiment, where steps 220-250 are repeated using only inliers, the error score distribution of the inlier-learned structure can be used as the null distribution and the distribution of the whole set can be compared to that of the inliers.

In block 280 of the process, the results of satisfication analysis are output to one or more data files. In one embodiment, one file comprises only inliers and a second file comprises only outliers. In one embodiment, one file comprises inliers, user selected outliers, and a second file comprises outliers not selected by the user. In one embodiment, a single file is output and inliers and outliers are flagged as such.

In one embodiment, output data files are provided in the same format as input files, and may additionally comprise user-supplied annotations and/or fields that identify data records (e.g. single survey responses) as inliers, outliers, user-accepted records or user-rejected records.

In one embodiment, a representation of each questionnaire response is output, by the computing device, each respective representation reflecting the likelihood that the respective response to which the respective representation represents satisficing. In one embodiment the representations are output to an interface displayed on a display that allows the user to display and accept or reject individual responses.

Figure 6:
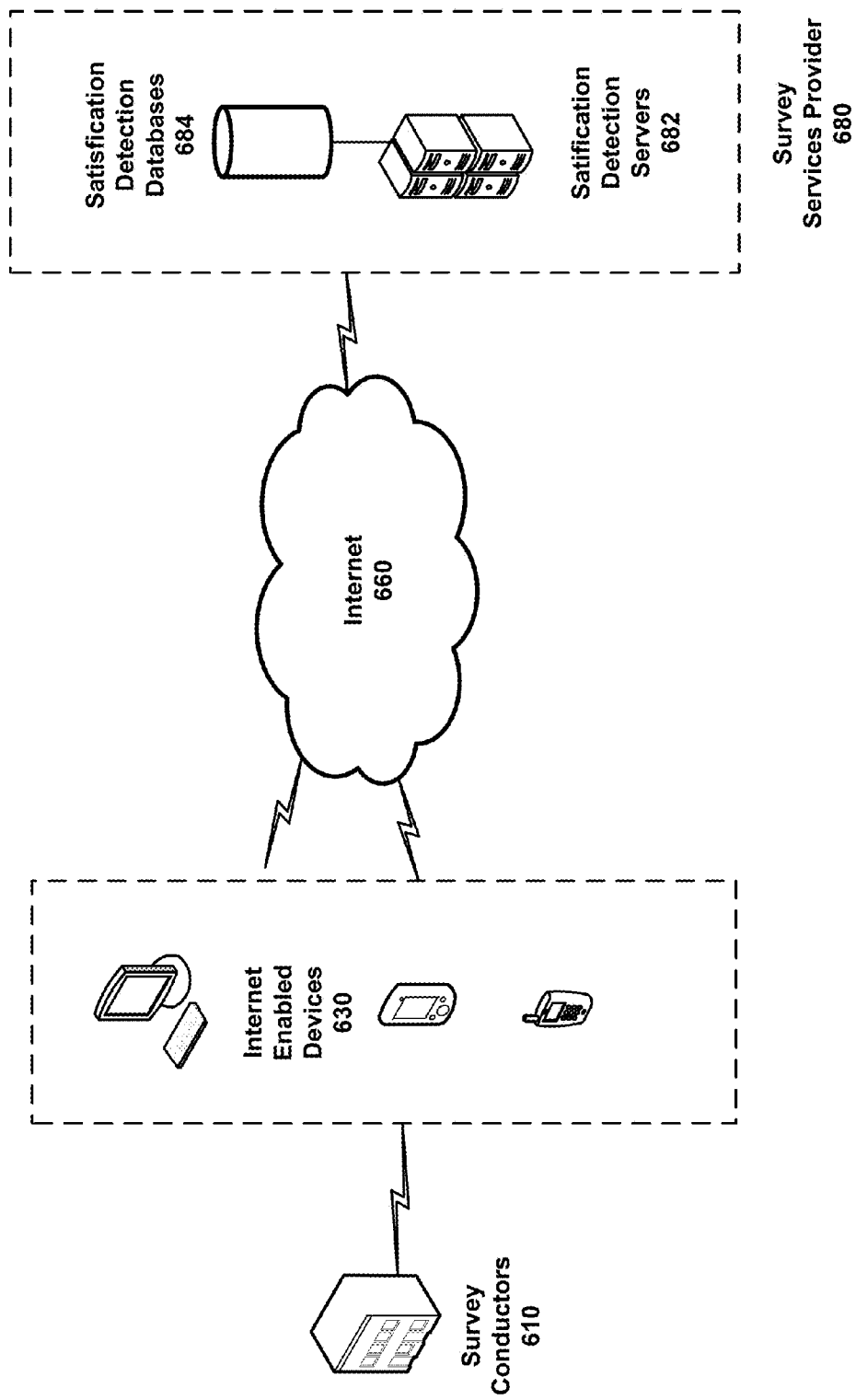
FIG. 6 is a block diagram illustrating an internal architecture of an example of a computing device, such as the satisfication detection servers 582 of FIG. 5, in accordance with one or more embodiments of the present disclosure.

FIG. 6 illustrates a high-level view of one embodiment of a system 600 capable of supporting various embodiments of the systems and methods described herein. Survey conductors 610 such as, for example, marketing research firms or corporations manufacturing and marketing consumer products, conduct surveys relating to various topics of interest. Such surveys could be conducted using any survey methodology now known or later developed in the art, including in-person surveys with manual data collection, telephone surveys with manual or electronic data collection or via Internet based surveys.

In one embodiment, surveys are conducted using questionnaires comprising a plurality of questions. Survey results are reflected in a plurality of questionnaire responses, each response relating to a single person or entities answers to at least a subset of the plurality of questions. In one embodiment, if a survey conductor 610 wishes to analyze survey results for satisficing, the survey conductor can utilize the services of a survey services provider 680 via a network 650 such as the Internet.

In one embodiment, regardless of how such surveys are initially conducted, questionnaire responses are ultimately reduced to an electronic format such as, for example, a data file where each record in the file reflects a single questionnaire response or a spreadsheet where each row in the spreadsheet reflects a single survey response. The questionnaire responses are then transmitted by the survey conductor 610, via one or more Internet enabled devices 630, over the Internet 660 to the survey services provider 682.

The survey services provider 680 then analyzes questionnaire responses to identify satisficing in the responses. In one embodiment, satisfaction detection servers 682 detect outliers in the questionnaire responses using, inter alia, an input data model and processes such as those described above with reference to FIG. 2. In one embodiment, the input data model is defined and created by the survey conductor 610 and transmitted to the survey services provider 680 via the Internet 660. In one embodiment, the input data model is defined and created by the survey services provider 680. In one embodiment, questionnaire responses and/or input data models are persistently stored on satisfaction detection databases 684.

In one embodiment, the detection servers 682 provide one or more user interfaces for satisfaction services that are accessible over the Internet 660 using Internet enabled devices 630. In one embodiment, such interfaces could be browser-based, and displayable by Internet enabled devices 630 with or without specialized browser plug-ins. In one embodiment, such interfaces could be provided by client software provided by the survey services provider. In one embodiment, the user interface for satisfaction services could provide various functions such as, for example, functions to:
  upload input data models and questionnaire responses;
  control and monitor the progress of satisfaction detection;
  view the results of satisfaction detection;
  view individual questionnaire responses and accept or reject such responses;
  export results data files comprising only inliers as determined by the satisfaction analysis, only outliers as determined by the satisfaction analysis or selected inliers and/or outliers;
  annotate results data files;
  download results data files.

In one embodiment, the survey services provider 680 additionally provides various types of automated survey services such as, for example, voice response surveys and Internet surveys, and the survey conductor 610 utilizes such services to collect questionnaire responses. Such responses can then be analyzed by the satisfaction detection servers 682 without the need to transmit responses or input data models from the survey conductor 610 to the survey services provider. In one embodiment, automated survey services may be hosted in whole or in part on the satisfaction detection servers 680.

The system shown in FIG. 6 is purely illustrative. Those skilled in the art will appreciate that the functions provided by the system in FIG. 6 could be provided by a number of alternate configurations. For example, service provided by satisfaction detection servers 682 could be distributed across multiple servers controlled by more than one entity. For example, satisfaction detection servers 682 and databases 684 could represent virtual servers and cloud-based data storage provided by one or more cloud based services entities. Alternatively or additionally, a survey conductor 610 could host satisfaction services and the cloud-based data storage.

Figure 7:
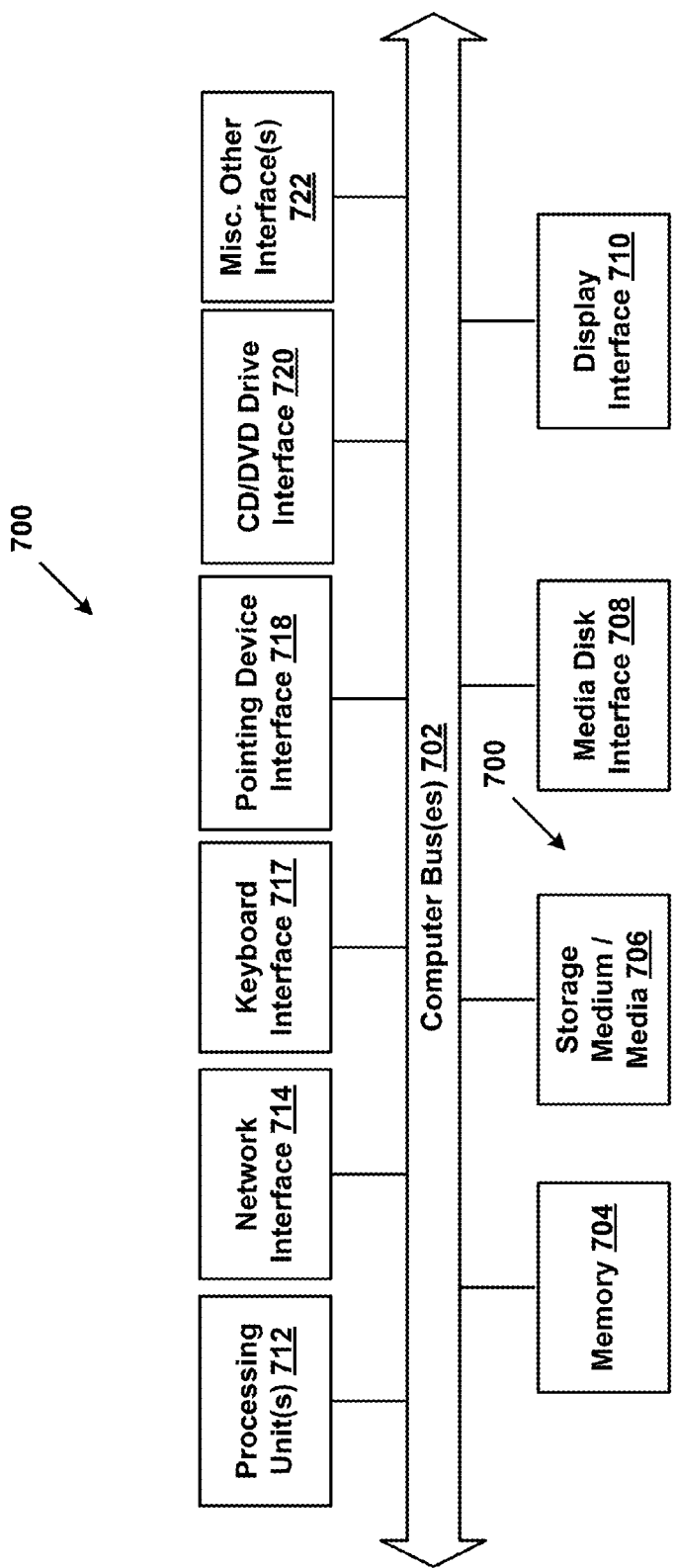
FIG. 7 is a block diagram illustrating an internal architecture of a computer device.

FIG. 7 is a block diagram illustrating an internal architecture of an example of a computing device, such as the satisfication detection servers 782 of FIG. 7, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 7, internal architecture 700 includes one or more processing units (also referred to herein as CPUs) 712, which interface with at least one computer bus 702. Also interfacing with computer bus 702 are persistent storage medium/media 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, storage medium/media 706, removable media drive, and/or other storage device. CPU 712 can then execute the stored process steps in order to execute the loaded computer executable process steps. Stored data, e.g., data stored by a storage device, can be accessed by CPU 712 during the execution of computer executable process steps.

Persistent storage medium/media 706 is a computer-readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving, by a computing device, response data relating to a plurality of responses to a survey, the survey comprising a plurality of questions, the response data for each of the plurality of responses comprising a plurality of answers to at least a subset of the plurality of questions;
   creating, by the computing device, using the response data, a questionnaire response model;
   determining, by the computing device, for each questionnaire response of the plurality of questionnaire responses, a respective probability that the respective questionnaire response represents satisficing, such that where the respective probability is not less than a threshold, the respective questionnaire response is identified as an outlier, the threshold relating to a level of probability reflecting a confidence that where the respective probability is not less than the threshold, the respective questionnaire response represents satisficing, and
   where the respective probability does not exceed the threshold, the respective questionnaire response is identified as an inlier; and
   outputting, by the computing device, a representation of each questionnaire response of the plurality of questionnaire responses, each respective representation reflecting the likelihood that the respective response to which the respective representation represents satisficing.

2. The method of claim 1 wherein the creating and determining are repeated using a subset of the plurality of questionnaire responses identified as inliers as input to the creating a questionnaire response model.

3. The method of claim 1 wherein the creating and determining are iteratively repeated, wherein for each iteration, a respective subset of the plurality of questionnaire responses are identified as inliers and the respective subset of the plurality of questionnaire responses are input to the creating of a next iteration.

4. The method of claim 1 wherein the questionnaire response model comprises a plurality of parameters, each parameter comprising a probability that a respective value of an answer to a respective one question of the plurality of questions represents satisficing.

5. The method of claim 4 wherein for each questionnaire response of the plurality of responses, for at least some of the answers in the respective questionnaire response, a probability that a value of the respective answer represents satisficing is determined using a respective one of the plurality of parameters that relates to the value of the respective answer, wherein the respective probability that a value of the respective answer represents satisficing for at least some of the answers in the respective response are used to determine the respective probability that the respective questionnaire response represents satisficing.

6. The method of claim 4 wherein the questionnaire response model is created by a method comprising:
   creating, by the computing device, using the response data, the questionnaire response model using structure learning techniques, wherein the questionnaire response model comprises a probabilistic graphical model reflecting a learned structure for the response data; and
   estimating, by the computing device, the plurality of parameters of the questionnaire response model.

7. The method of claim 6, wherein the structure learning techniques searches through a space of possible structures using simulated annealing, and chooses a best structure according to Bayesian Dirichlet Equivalence criterion, wherein a best structure is used to create the questionnaire response model.

8. The method of claim 6, wherein the plurality of parameters of the questionnaire response model are estimated using a method comprising:
   creating, by the computing device, using the questionnaire response model, a Bayesian network;
   estimating, by the computing device, the plurality of parameters of the questionnaire response model using the Bayesian network.

9. The method of claim 8 comprising:
   modifying, by a computing device, the response data such that, for each response of the plurality of responses, the value of each respective answer of the plurality of answers is transformed to a respective discrete value, the respective discrete value comprising a respective one integer of a plurality of integers;
   wherein the modified response data is input to the creating a questionnaire response model.

10. The method of claim 9 wherein the estimating the plurality of parameters of the questionnaire response model using the Bayesian network comprises determining, for each question of the plurality of questions, a respective probability mass function for the respective question $F_i$ with m possible discrete values, conditioned on a set of parent nodes $\rho(F_i)$ from the Bayesian network, using the equation:

$$P(F_i = f_i | \{F_j = f_j : F_j \in \rho(F_i)\}) = \frac{N(F_i = f_i, \{F_j = f_j : F_j \in \rho(F_j)\})}{N(\{F_j = f_j : F_j \in \rho(F_i)\})}$$

where $P(F_i=f_i|\{F_j=f_j:F_j\epsilon\rho(F_i)\})$ is a the conditional probability of an answer to the respective question Fi taking a value $f_i$, given that a respective value of an answer to each question j in $\rho(F_i)$ has a respective value $f_j$, and N(X) is the number of questionnaire responses that match a condition X.

11. The method of claim 10 wherein for a respective response of the plurality of responses, where a respective answer is not present for a respective one question of the plurality of questions, an answer to the respective question is added to the response for the respective one question comprising a null value.

12. The method of claim 1 comprising:
receiving, by a computing device, an input data model comprising a plurality of question definitions, such that each question definition of the plurality of question definitions relates to a respective one question of the plurality questions, each question definition comprising a respective expected answer data type; and
processing, by a computing device, using the input data model, the response data, creating modified response data comprising at least some of the plurality of responses, such that where a respective one response of the plurality of responses comprises a respective answer to a respective one question of the plurality of questions and a data type of a value of the respective answer does not match the respective expected answer data type of a respective question definition of the plurality of question definitions that relates to the respective one question, the respective one response is not included in the modified response data,
wherein the modified response data is input to the creating a questionnaire response model.

13. The method of claim 9 comprising:
receiving, by a computing device, an input data model comprising a plurality of question definitions, such that each question definition of the plurality of question definitions relates to a respective one question of the plurality questions, each question definition comprising, each question definition of the plurality of question definitions comprising a respective maximum index value, the respective maximum index value comprising a maximum discrete value for answers to the respective question;
processing, by a computing device, using the input data model, the response data, creating modified response data comprising at least some of the plurality of responses, such that where a respective one response of the plurality of responses comprises a respective answer to a respective one question of the plurality of questions and a value of the respective answer exceeds the respective maximum index value of a respective question definition of the plurality of question definitions that relates to the respective one question, the respective one response is not included in the modified response data, wherein the modified response data is input to the creating a questionnaire response model.

14. The method of claim 1 additionally comprising:
determining, by a computing device, a time required to process the input data;
causing, by the computing device, the time required to process the input data to be displayed to a user on a user computing device, wherein the user is presented with an option to terminate processing;
receiving, by the computing device, an indication from the user that the user has selected the option to terminate processing; and
in response to receiving the indication from the user that the user has selected the option to terminate processing, terminating, by the computing device, processing of the input data.

15. The method of claim 1 wherein the creating and determining are iteratively repeated until no outliers are identified in the respective subset of the plurality of questionnaire responses.

16. The method of claim 1 wherein the creating and determining are iteratively repeated until a number of inliers in the respective subset of the plurality of questionnaire responses does not change for two iterations.

17. The method of claim 6 additionally comprising:
receiving, by the computing device, over a network, from a user, modifications to the questionnaire response model;
modifying, by the computing device, the questionnaire response model in response to modifications to the questionnaire response model received from a user,
wherein the modified response model is input to the estimating computing the plurality of parameters of the questionnaire response model.

18. The method of claim 1 additionally comprising:
outputting, by the computing device, to a first data file, each questionnaire response of the plurality of questionnaire responses that is identified as an inlier;
outputting, by the computing device, to a second data file, each questionnaire response of the plurality of questionnaire responses that is identified as a outlier.

19. The method of claim 18 additionally comprising:
transmitting, by the computing device, the first data file and the second data file, over a network, to a user.

20. The method of claim 1 additionally comprising:
causing, by the computing device, over a network, a user device associated with a user to display a representation of the number of inliers and the number of outliers.

21. The method of claim 1 wherein the response data is received in the form of a batched data file.

22. The method of claim 1 wherein the response data is received in real-time from an online survey system.

23. A computer readable storage media for tangibly storing thereon computer readable instructions for a method comprising:
receiving response data relating to a plurality of responses to a survey, the survey comprising a plurality of questions, the response data for each of the plurality of responses comprising a plurality of answers to at least a subset of the plurality of questions;
creating, by the computing device, using the response data, a questionnaire response model;
determining. for each questionnaire response of the plurality of questionnaire responses, a respective probability that the respective questionnaire response represents satisficing, such that
where the respective probability is not less than a threshold, the respective questionnaire response is identified as an outlier, the threshold relating to a level of probability reflecting a confidence that where the respective probability is not less than the threshold, the respective questionnaire response represents satisficing, and where the respective probability does not exceed the threshold, the respective questionnaire response is identified as an inlier; and outputting, a representation of each questionnaire response of the plurality of questionnaire responses, each respective representation reflecting the likelihood that the respective response to which the respective representation represents satisficing.

24. A computing device comprising:

a processor;

a storage medium for tangibly storing thereon program logic for execution by the processor, the program logic comprising:

response data receiving logic executed by the processor for receiving response data relating to a plurality of responses to a survey, the survey comprising a plurality of questions, the response data for each of the plurality of responses comprising a plurality of answers to at least a subset of the plurality of questions;

questionnaire response model creation logic executed by the processor for creating, using the response data, a questionnaire response model;

satisficing determination logic executed by the processor for determining, for each questionnaire response of the plurality of questionnaire responses, a respective probability that the respective questionnaire response represents satisficing, such that where the respective probability is not less than a threshold, the respective questionnaire response is identified as an outlier, the threshold relating to a level of probability reflecting a confidence that where the respective probability is not less than the threshold, the respective questionnaire response represents satisficing, and where the respective probability does not exceed the threshold, the respective questionnaire response is identified as an inlier; and data output logic executed by the processor for outputting a representation of each questionnaire response of the plurality of questionnaire responses, each respective representation reflecting the likelihood that the respective response to which the respective representation represents satisficing.

* * * * *